UNITED STATES PATENT OFFICE.

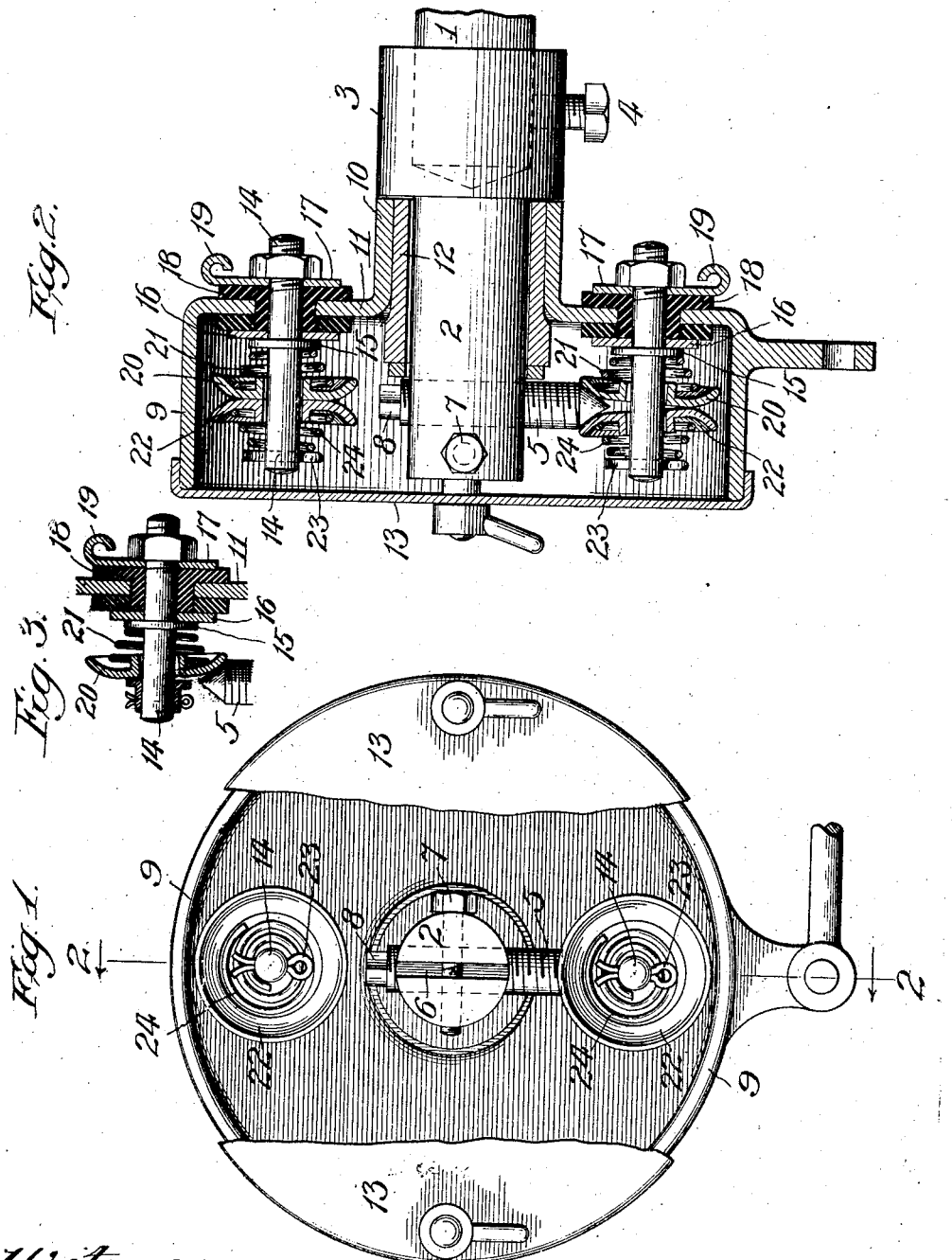

ALVARO S. KROTZ, OF CHICAGO, ILLINOIS.

TIMER.

No. 930,196.　　　Specification of Letters Patent.　　　Patented Aug. 3, 1909.

Application filed February 28, 1907.　Serial No. 359,778.

*To all whom it may concern:*

Be it known that I, ALVARO S. KROTZ, a citizen of the United States of America, and a resident of Chicago, in the county of Cook and State of Illinois, have invented certain new and useful Improvements in Timers, of which the following is a specification.

This invention relates to timer mechanisms used in connection with the electric sparking systems of explosion engines, and has for its object to provide a simple and efficient structural formation and combination of parts adapted to afford a very extended and effective electrical contact, with but little incidental frictional wear, between the revoluble and stationary members of the timer mechanism; and in which the adjustment, removal, repair or replacement of a worn part can be effected in a ready and convenient manner, all as will hereinafter more fully appear.

In the accompanying drawings:—Figure 1, is a front elevation, with part of the cover broken away, of a timer mechanism embodying the present invention. Fig. 2, is a longitudinal section of the same on line 2—2, Fig. 1. Fig. 3, is a detail longitudinal section of a modification.

Similar numerals of reference indicate like parts in the different views.

Referring to the drawings, 1 is the end portion of the usual shaft from which rotation is imparted to the distributing member of the timer mechanism.

2, is the carrying arbor of the distributing member, secured in longitudinal alinement to the driving shaft 1 in any usual manner which will permit of convenient disengagement when desired; in the drawing said arbor is shown provided with a tubular sleeve 3 at its end adapted to fit over the end of the shaft 1, and secured in place by a set screw 4, or other usual fastening means.

5, is the distributing member of the timer mechanism above referred to, and which in the present improvement comprises a stem formed with a conical or tapered outer end and attached in a transverse direction in the forward end of the arbor 2, preferably in a radially adjustable manner. In attaining such radial adjustment any usual means may be employed, preference is however given to means shown in the drawing, and in which the stem 5 is formed with a screw-threaded periphery which fits a corresponding screw-threaded orifice extending transversely through the arbor 2 as shown. The end of said arbor is formed with a longitudinal slit 6 which extends through the screw-threaded orifice aforesaid, and a transverse clamping bolt 7 screws through the split ends of the arbor thus formed to clamp the same upon the stem 5 to hold the same at the required adjustment in a firm and substantial manner.

8, is a non-circular head on the stem 5 for convenience in effecting a manual adjustment of the same.

9, is a cup shaped casing carrying the series of contacts of the timer mechanism; such casing is held in concentric relation to the arbor 2 by means of a hub 10, on the rear end heading 11 of the casing, and an interposed bushing 12 having bearing upon the arbor 2 as shown. The casing 9 will be provided with the usual radial arm or equivalent device, whereby a partial rotation of the casing and the series of contacts carried thereby, is effected and the parts held at the desired adjustment, as usual in the present type of timer mechanisms.

13, is a cover fitting the forward end of the casing 9 to form a dust proof inclosure for the mechanism.

14, are a series of stems secured in an insulated manner in the end head 11 of the casing 9 aforesaid, by means of fixed collars 15, bearing washers 16 and 17 and interposed bushings 18 of insulating material as shown in Fig. 1.

19 are hook shaped terminals on the rear washers 17 for the convenient attachment of the line wires of the sparking circuit.

20 are disks of conducting material arranged loosely upon the stem 14 and resting upon elastic cushions or springs 21 interposed between said disks and the fixed collars 15 of said stems as shown. In the present improvement such disks are formed with beveled or conical peripheries corresponding with the taper of the outer ends of the distributing stem 5 aforesaid, and adapted in the orbital movement of such outer end of the distributing stem to contact and establish electrical connection between the parts. With the described arrangement of the disks 20, the same are free to rotate, to tilt and to move longitudinally upon the stems 14 against the stress of the springs 21, and in consequence a very effective electrical connection is had with but little frictional wear between the parts, in that the disks have a turning movement along with the distributing stem during the period of contact between the parts.

In the simpler form of the present invention as illustrated in Fig. 3, a single disk 20 is used at each point at which electrical contact is desired. In the preferred form of the invention as illustrated in Fig. 2, a pair of such disks are employed at each point at which an electrical contact is desired; in such preferred construction the outer disks 22, will have the bevel of their conical peripheries in a direction opposite to that of the inner disk 20, before described, to provide angular channels between the pairs of disks for the reception of the conical or tapering outer end of the distributing stem 5, with a view to afford a very extended electrical contact between the parts. 23 are removable collars or keys at the outer ends of the stems 14; and 24 are elastic cushions or springs interposed between said collars or keys and the disks 22 for yieldingly holding the said disks against the companion disks 20 before described.

Having thus fully described my said invention what I claim as new and desire to secure by Letters Patent is:—

1. In a timer, the combination of an arbor, a distributing member consisting of a lateral stem carried by said arbor and formed with a tapering outer end, a casing carrying a series of contacts, each contact comprising a supporting stem carried by said casing, and a contact disk having a larger bore than its supporting stem to provide a tilting as well as a lateral movement of the disk, said disk having a beveled periphery, and an elastic abutment for said disk, substantially as set forth.

2. In a timer, the combination of an arbor, a distributing member consisting of a lateral stem carried in a radially adjustable manner by said arbor and formed with a tapering outer end, a casing carrying a series of contacts, each contact comprising a supporting stem carried by said casing, and a contact disk having a larger bore than its supporting stem to provide a tilting as well as a lateral movement of the disk, said disk having a beveled periphery, and an elastic abutment for said disk, substantially as set forth.

3. In a timer, the combination of an arbor, a distributing member consisting of a lateral stem having a tapering outer end and a screw-threaded periphery fitting a screw threaded orifice formed transversely in said arbor, the said arbor having a longitudinal slit at its forward end intersecting said screw-threaded orifice, a transverse clamping bolt arranged in the outer part of said arbor, a casing carrying a series of contacts, each contact comprising a supporting stem carried by said casing, and a contact disk having a larger bore than its supporting stem to provide a tilting as well as a lateral movement of the disk, said disk having a beveled periphery, and an elastic abutment for said disk, substantially as set forth.

4. In a timer, the combination of an arbor, a distributing member consisting of a lateral stem carried by said arbor and formed with a tapering outer end, a casing carrying a series of contacts, each contact comprising a supporting stem carried by said casing, and a pair of contact disks having bores larger than their supporting stem to provide a tilting as well as a lateral movement of the disks, said disks having beveled peripheries, and elastic abutments for said disks, substantially as set forth.

5. In a timer, the combination of an arbor, a distributing member consisting of a lateral stem carried in a radially adjustable manner by said arbor and formed with a tapering outer end, a casing carrying a series of contacts, each contact comprising a supporting stem carried by said casing, and a pair of contact disks having bores larger than their supporting stem to provide a tilting as well as a lateral movement of the disks, said disks having beveled peripheries, and elastic abutments for disks, substantially as set forth.

6. In a timer, the combination of an arbor, a distributing member consisting of a lateral stem having a tapering outer end and a screw-threaded periphery fitting a screw threaded orifice formed transversely in said arbor, the said arbor having a longitudinal slit at its forward end intersecting said screw-threaded orifice, a transverse clamping bolt arranged in the outer part of said arbor, a casing carrying a series of contacts, each contact comprising a supporting stem carried by said casing, and a pair of contact disks having bores larger than their supporting stem to provide a tilting as well as a lateral movement of the disks, said disks having beveled peripheries, and elastic abutments for said disks, substantially as set forth.

Signed at Chicago, Illinois this 19th day of February 1907.

ALVARO S. KROTZ.

Witnesses:
ROBERT BURNS,
HENRY MOE.